(12) United States Patent
El-Gammal et al.

(10) Patent No.: US 12,474,121 B2
(45) Date of Patent: Nov. 18, 2025

(54) EVAPORATIVE COOLING SYSTEM FOR HEAT EXCHANGER COOLING OF AN ELECTRIC VEHICLE

(71) Applicant: Robert Bosch GmbH, Stuttgart (DE)

(72) Inventors: Mohamed Moustafa El-Gammal, Windsor (CA); Juergen Guenther Zybell, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 1022 days.

(21) Appl. No.: 17/539,884

(22) Filed: Dec. 1, 2021

(65) Prior Publication Data

US 2023/0168041 A1 Jun. 1, 2023

(51) Int. Cl.
| | |
|---|---|
| F28D 5/02 | (2006.01) |
| B60K 11/04 | (2006.01) |
| F28F 25/06 | (2006.01) |
| F28F 27/00 | (2006.01) |

(52) U.S. Cl.
CPC ............. *F28D 5/02* (2013.01); *B60K 11/04* (2013.01); *F28F 25/06* (2013.01); *F28F 27/00* (2013.01)

(58) Field of Classification Search
CPC .................................. B60K 11/02; F01P 9/02
See application file for complete search history.

(56) References Cited

U.S. PATENT DOCUMENTS

| | | | |
|---|---|---|---|
| 7,036,466 B2 | 5/2006 | Goebel et al. | |
| 8,216,736 B2 | 7/2012 | Kwon | |
| 8,298,713 B2 | 10/2012 | Skala | |
| 9,590,282 B2 | 3/2017 | Kossakovski et al. | |
| 9,827,824 B2 | 11/2017 | Enomoto et al. | |
| 10,411,275 B2 | 9/2019 | Kwon | |
| 2002/0184901 A1 | 12/2002 | Ishikawa | |
| 2019/0107332 A1* | 4/2019 | Rede | F24F 6/14 |
| 2019/0316849 A1* | 10/2019 | Mendez Abrego | B60K 11/02 |

FOREIGN PATENT DOCUMENTS

| | | |
|---|---|---|
| CN | 101312246 A | 11/2008 |
| JP | 2017152213 A2 | 8/2017 |
| JP | 2019043385 A | 3/2019 |
| KR | 20160026212 A | 3/2016 |
| KR | 101776414 B1 | 9/2017 |

OTHER PUBLICATIONS

Kandlikar et al., "Thermal management issues in a PEMFC stack—a brief review of current status", Applied Thermal Engineering, 2019, vol. 29, pp. 1276-1280.

* cited by examiner

*Primary Examiner* — Jianying C Atkisson
*Assistant Examiner* — Khaled Ahmed Ali Al Samiri
(74) *Attorney, Agent, or Firm* — Michael Best & Friedrich LLP

(57) ABSTRACT

A system and method for evaporative cooling a radiator of an electric vehicle. The system includes a fluid tank containing a fluid, a nozzle fluidly coupled to the fluid tank, and an electronic processor. The electronic processor is configured to receive environmental condition information, determine a first effectiveness factor of operating the nozzle to cool the radiator based on the environmental condition information, and determine a second effectiveness factor of cooling the radiator by operating a thermal management system. The electronic processor is further configured to operate the nozzle such that a fluid output is ejected at the radiator of the vehicle when the first effectiveness factor is greater than the second effectiveness factor.

19 Claims, 5 Drawing Sheets

EVAPORATIVE COOLING SYSTEM FOR HEAT EXCHANGER COOLING OF AN ELECTRIC VEHICLE

FIELD

Embodiments presented herein relate to evaporative cooling systems for components of an electric vehicle.

BACKGROUND

Stricter emission legislation and regulation requiring reduced emissions from passenger and commercial vehicles are likely in the future. As a result, there is a growing interest among vehicle manufacturers to diversify their powertrain portfolio to include electric vehicles. Broadly, electric vehicles may include fuel cell vehicles (FCV), battery electric vehicles (BEV), and hybrid electric vehicles (HEV).

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
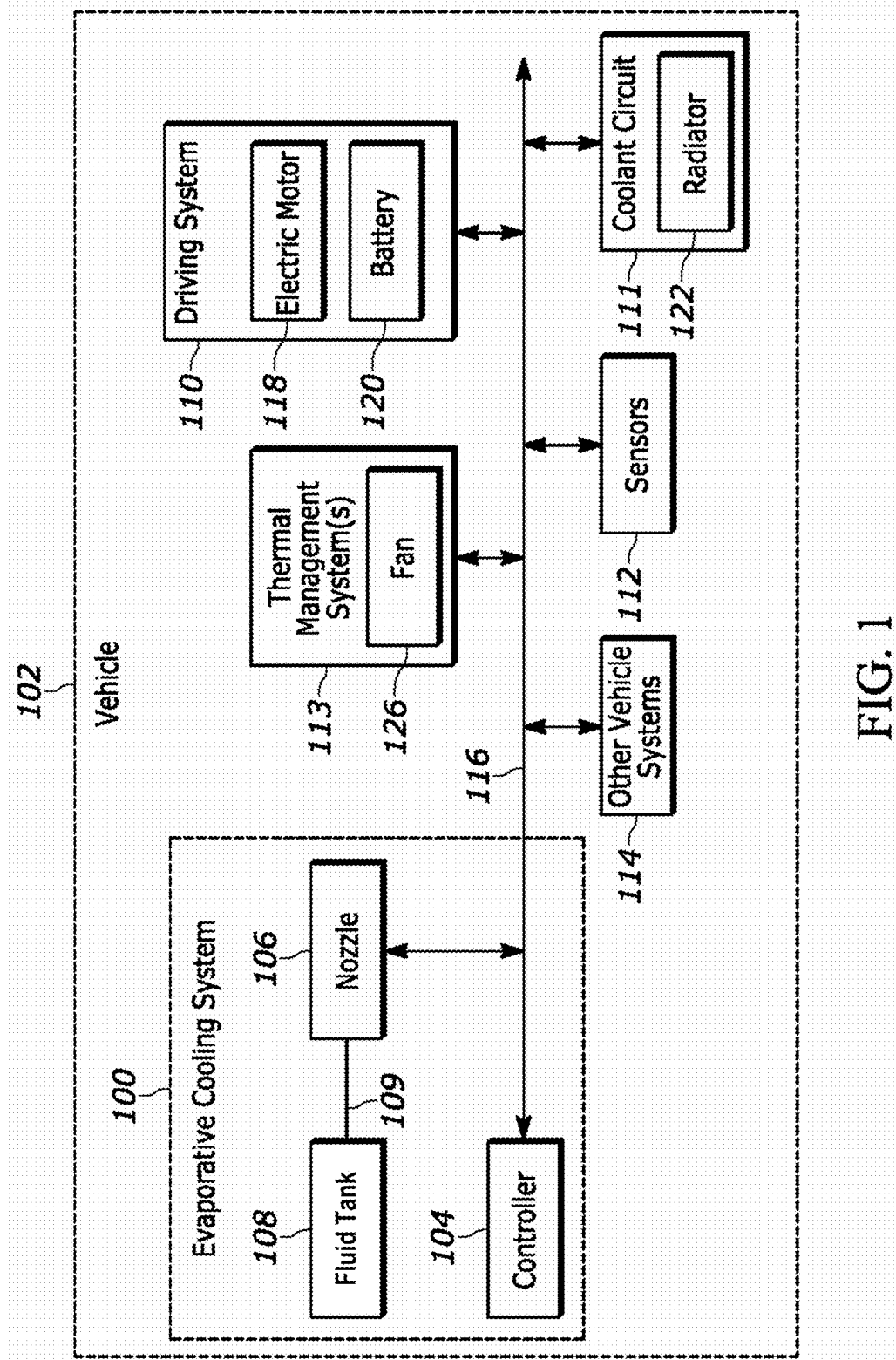
FIG. 1 is a block diagram of an evaporative cooling system for an electric vehicle, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments illustrated.

The apparatus and method components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

SUMMARY

Thermal management of various powertrain components (for example, AC/DC inverters, DC/DC converters, chargers, electric traction motors, battery packs and fuel cell stacks in case of FCVs) is an important factor affecting the performance, safety, and durability of electric vehicles. Thermal management of electric powertrain vehicles is particularly important in high ambient temperature and high-power load conditions. While thermal management is important, the energy needed and consumed for thermal control of such components is a countervailing consideration because energy consumed for thermal management reduces the overall amount of available energy and may adversely affect an electric vehicle's driving range.

Thermal management systems for electric vehicles should be energy efficient to prevent impacting the driving range of the vehicle. Lithium ion battery pack cells and fuel cell stacks tend to have narrow temperature operating ranges. Most power electronics also have particular temperature limits (for example, 65° C.). Developing thermal management strategies to meet such narrow temperature ranges is challenging. Some strategies require relatively large radiators. Using large radiators can result in increased weight, cost, and packaging challenges. Another strategy is the utilization of active refrigeration cooling circuits for controlling various powertrain components such as battery packs. However, due to refrigerant compressor energy requirements, the electric vehicle drive range may be negatively affected when using compressors.

Evaporative cooling has the advantage of lower power consumption compared to active cooling systems and thus does not adversely affect the vehicle driving range. Accordingly, systems and methods are provided herein for, among other things, evaporative cooling of electronic driving components of an electric vehicle.

One embodiment provides a radiator thermal management system for a radiator of an electric vehicle. The system includes a fluid tank containing a fluid, a nozzle fluidly coupled to the fluid tank, and an electronic processor. The electronic processor is configured to receive environmental condition information, determine a first effectiveness factor of operating the nozzle to cool the radiator based on the environmental condition information, and determine a second effectiveness factor of cooling the radiator by operating a thermal management system. The electronic processor is further configured to operate the nozzle such that a fluid output is ejected at the radiator of the vehicle when the first effectiveness factor is greater than the second effectiveness factor.

Another embodiment provides a method for thermally managing a radiator of an electric vehicle. The vehicle includes a nozzle fluidly coupled to a fluid tank containing a fluid and configured to eject the fluid at the radiator of the vehicle. The method includes receiving environmental condition information, determining a first effectiveness factor of operating the nozzle based on the environmental condition information, and determining a second effectiveness factor of a thermal management system for the radiator. The method also includes operating the nozzle such that a fluid output is ejected at a radiator of the vehicle when the first effectiveness factor is greater than the second effectiveness factor.

DETAILED DESCRIPTION

Before any embodiments are explained in detail, it is to be understood that the examples presented herein are not limited in their application to the details of construction and the arrangement of components set forth in the following description or illustrated in the drawings. Embodiments may be practiced or carried out in various ways. For example, while the systems and methods are described herein in terms of automotive systems, such systems and methods may be applied to other types of vehicle systems.

Also, it is to be understood that the phraseology and terminology used herein is for the purpose of description and should not be regarded as limiting. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software-based devices, as well as a plurality of different structural components may be used to implement the embodiments presented herein. Some embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (for example, stored on non-transitory computer-readable medium) executable by one or more electronic processors. Therefore, it should be noted that a plurality of hardware and software-based devices, as well as a plurality of different structural components may be utilized to implement the embodiments presented. For example, "control units" and "controllers" described in the specification can include one or more electronic processors, one or more memory modules including non-transitory computer-readable medium, one or more input/output interfaces, and various connections (for example, a system bus) connecting the components.

For ease of description, some of the example systems presented herein are illustrated with a single exemplar of each of its component parts. Some examples may not describe or illustrate all components of the systems. Other embodiments may include more or fewer of each of the illustrated components, may combine some components, or may include additional or alternative components.

FIG. 1 is a block diagram of one example embodiment of an evaporative cooling system 100 of an electric vehicle 102 (for example, a fully electric vehicle or an electric hybrid vehicle). The evaporative cooling system 100 may be mounted on or integrated into the vehicle 102. Although the vehicle 102 is described herein as a four-wheeled car, the systems and methods described herein can be applied to various other types and designs of electric vehicles or other operative machinery. For example, in various different implementations, the vehicle 102 may by an automobile, a motorcycle, a truck, a bus, a semi-tractor, or other type of vehicle. In the example illustrated, the evaporative cooling system 100 includes an electronic controller 104, and a nozzle 106 fluidly coupled to a fluid tank 108 via a feed line 109. The vehicle 102 includes a driving system 110, a fluid coolant circuit 111, one or more sensors 112, one or more thermal management systems 113, and other vehicle systems 114. The components of the system 100 and vehicle 102, along with other various modules and components are electrically coupled to each other by or through one or more control or data buses (for example, the bus 116), which enable communication therebetween. The use of control and data buses for the interconnection between, and communication among, the various modules and components would be known to a person skilled in the art in view of the invention described herein. In some embodiments, the bus 116 is a Controller Area Network (CAN™) bus. In some embodiments, the bus 116 is an automotive Ethernet™, a FlexRay™ communications bus, or another suitable wired bus. In alternative embodiments, some or all of the components of the system 100 may be communicatively coupled using suitable wireless modalities (for example, Bluetooth™ or near field communication).

For ease of description, the system 100 and vehicle 102 illustrated in FIG. 1 include one of each of the foregoing components. Alternative embodiments may include one or more of each component or may exclude or combine some components.

The driving system 110 of the electric vehicle 102 is configured to provide driving power to move the vehicle 102. The driving system 110 is, for example, an electric or hybrid driving system. For example, the driving system 110 may be an electric fuel cell system, a hybrid electric system, a battery electric system, or a combination thereof. The driving system 110, as illustrated, includes an electric motor 118 and a battery 120. The driving system 110 includes additional components (for example, an inverter, converter, drivetrain, etc.) which, for sake of brevity, are not described in detail herein. The driving system 110 also includes certain components depending on the type of electric vehicle 102. For example, in embodiments where the vehicle 102 is a hybrid vehicle, the system 110 includes a combustion engine and, in embodiments where the vehicle 102 is a fuel cell vehicle, the system 110 includes a fuel cell stack. The electric motor 118, in some embodiments, includes an electric generator (not shown) configured to charge the battery 120. The battery 120 provides the electric motor 118 power necessary to rotate a motor shaft (not shown) to drive the vehicle 102. The battery 120 may also provide power to one or more other components of the vehicle 102 (for example, the cooling system 100, coolant circuit 111, sensors 112, thermal management system 113, and other vehicle systems 114).

The fluid coolant circuit 111 includes a series of fluid lines configured to circulate a liquid coolant to one or more components of the vehicle 102. The fluid coolant circuit 111 also includes a radiator 122. The radiator 122 is a heat exchanger for providing cooling for one or more components of the vehicle 102.

As shown in more detail in FIGS. 5 and 6 (described in more detail below), the coolant circuit circulates coolant fluid through the vehicle 102 via one or more coolant feed lines to cool one or more components thereof. For example, the coolant circuit 111 provides cooling for the battery 120 and/or the electric motor 118. The coolant fluid, heated following cooling the one or more components, is fed to the radiator 122. Heat from the heated coolant fluid inside the radiator 122 is transferred to the air outside of the radiator 122, cooling the coolant fluid. The coolant fluid is then recirculated to cool the one or more components of the vehicle 102.

In order to maintain effective operation of the vehicle 102, one or more thermal management systems 113, in addition to the evaporative cooling system 100, are utilized to cool the radiator 122 and/or other components of the vehicle 102. For example, as illustrated in FIG. 1, the vehicle 102 includes a fan 126 configured to blow air at the radiator 122 to cool it. The vehicle 102 may include additional thermal management systems aside the fan 126 (for example, a coolant compressor system).

The sensors 112 determine one or more attributes of the vehicle and its surrounding environment and communicate information regarding those attributes to the other components of the vehicle 102 (for example, the controller 104) using, for example, electrical signals. The vehicle attributes include, for example, a temperature and/or humidity of the vehicle 102, the environment surrounding the vehicle 102, or portions or components of the vehicle 102, the movement of the vehicle 102 or portions or components of the vehicle 102, the forces acting on the vehicle 102 or portions or components of the vehicle 102, the proximity of the vehicle 102 to other vehicles or objects (stationary or moving), vehicle speed, longitudinal acceleration, lateral acceleration, and the like. The sensors 112 may include, for example, temperature sensors, humidity sensors, object detection sensors, wheel speed sensors, vehicle speed sensors, yaw sensors, force sensors, odometry sensors, and object proximity sensors (for example, camera, radar, LIDAR, and ultrasonic).

The other vehicle systems 114 include controllers, sensors, actuators, and the like for controlling aspects of the operation of the vehicle 102 (for example, steering, acceleration, braking, shifting gears, and the like). The other vehicle systems 114 are configured to send and receive data relating to the operation of the vehicle 102 to and from the controller 104. One or more components of such systems 114 may be cooled via the thermal management system(s) 113 and/or the evaporative cooling system 100.

Figure 4:
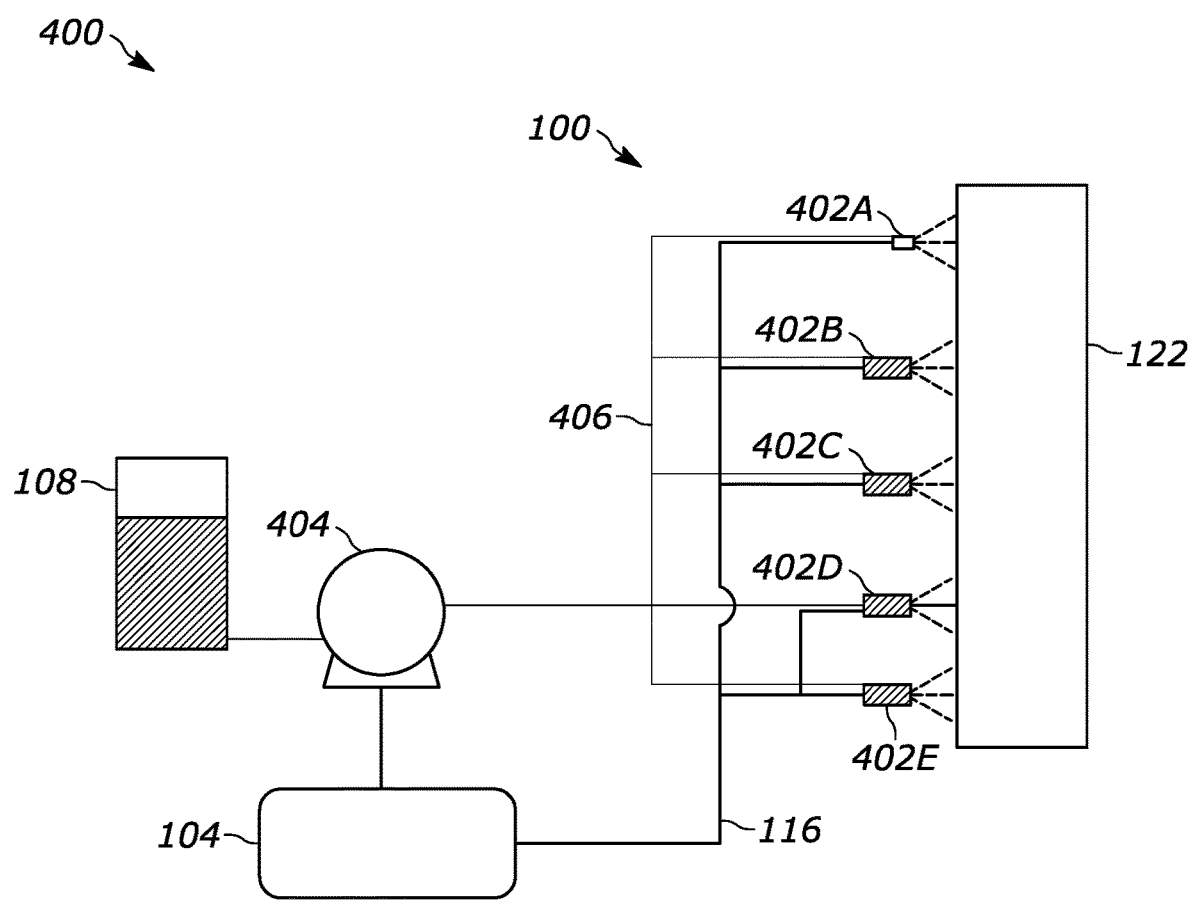
FIG. 4 is a schematic diagram illustrating cooling a radiator of an electric vehicle of FIG. 1, according to some embodiments.

The evaporative cooling system 100 is configured to cool one or more components of the vehicle 102 via evaporative cooling. In particular, the controller 104 operates the nozzle 106 such that fluid from the fluid tank 108 (fed to the nozzle 106 via feed line 109) is ejected/sprayed at one or more components of the vehicle 102. The controller 104 operates the nozzle 106 directly and/or by operating one or more pumps/valves (for example, pump 404 of FIG. 4) disposed on the feed line 109. The fluid ejected onto a component naturally evaporates, thus cooling the component. For example, in the embodiment illustrated in FIG. 1, the nozzle 106 is configured to eject a fluid output (from the fluid tank 108) at the radiator 122 of the vehicle 102 in order to evaporatively cool the radiator 122. It should be understood that, although only one nozzle 106 is illustrated in FIG. 1, in some embodiments, the system 100 includes more than one nozzle 106 (for example, as shown in FIGS. 4 and 5).

The fluid stored in the fluid tank 108 is a coolant. In some instances, the coolant is or includes water. In embodiments where the driving system 110 is a fuel cell system, the fluid in the fluid tank 108 receives exhaust/waste fluid from the system 110. In some embodiments, the fluid tank 108 includes one or more heating elements and/or cooling elements (not shown) communicatively coupled to the controller 104. The controller 104 may accordingly adjust a temperature of the fluid. One or more heating and/or cooling elements, communicatively coupled and operated by the controller 104, may alternatively or additionally be disposed along the feed line 109 and/or integrated into the nozzle 106. As explained in more detail below in regard to FIG. 3, the electronic controller 104 is configured to operate (control the fluid output to) the nozzle 106 to evaporatively cool the radiator 122.

Figure 2:
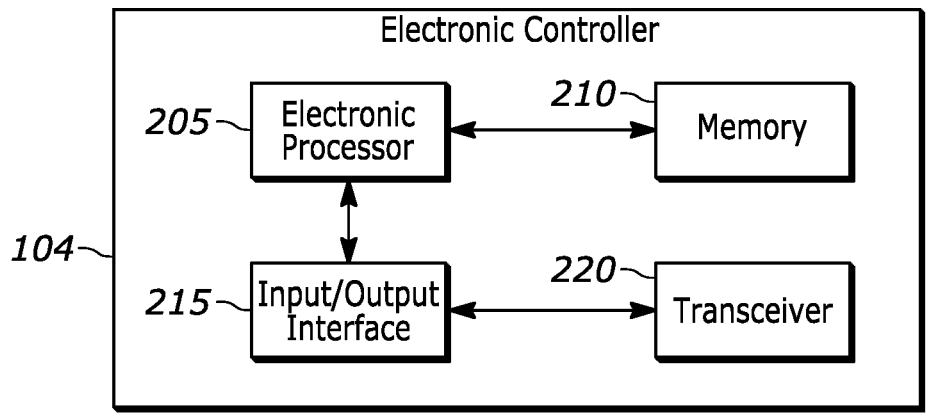
FIG. 2 is a block diagram of an electronic controller of the evaporative cooling system of FIG. 1, according to some embodiments.

FIG. 2 illustrates an example embodiment of the electronic controller 104, which includes an electronic processor 205 (for example, a microprocessor, application specific integrated circuit, etc.), a memory 210, and an input/output interface 215. The memory 210 may be made up of one or more non-transitory computer-readable media and includes at least a program storage area and a data storage area. The program storage area and the data storage area can include combinations of different types of memory, such as read-only memory ("ROM"), random access memory ("RAM") (for example, dynamic RAM ("DRAM"), synchronous DRAM ("SDRAM"), etc.), electrically erasable programmable read-only memory ("EEPROM"), flash memory, or other suitable memory devices. The electronic processor 205 is coupled to the memory 210 and the input/output interface 215. The electronic processor 205 sends and receives information (for example, from the memory 210, the input/output interface 215, and/or the transceiver 220) and processes the information by executing one or more software instructions or modules, capable of being stored in the memory 210, or another non-transitory computer readable medium. The software can include firmware, one or more applications, program data, filters, rules, one or more program modules, and other executable instructions. The electronic processor 205 is configured to retrieve from the memory 210 and execute, among other things, an evaporative cooling function for the radiator 122 of the vehicle 102 as described herein.

The input/output interface 215 transmits to and receives information from devices external to the electronic controller 104 over one or more wired and/or wireless connections. For example, the input/output interface 215 transmits to and receives information from components of the system 100 via the bus 116. The input/output interface 215 may also receive user input, provides system output, or a combination of both. The input/output interface 215 may also include other input and output mechanisms which for brevity are not described herein and which may be implemented in hardware, software, or a combination of both. The input/output interface 215, in some embodiments, includes a transceiver 220 for the controller 104 to transmit and receive information from other vehicles and/or networks. The input/output interface 215 is configured to receive environmental condition information, for example, from one or more of the sensors 112 and/or from one or more weather information networks, which are not shown, via the transceiver 220.

It should be understood that although FIG. 2 illustrates only a single electronic processor 205, memory 210, and input/output interface 215, alternative embodiments of the electronic controller 104 may include multiple processing units, memory modules, and/or input/output interfaces. It should also be noted that the system 100 may include other electronic controllers, each including similar components as, and configured similarly to, the electronic controller 104. In some embodiments, the electronic controller 104 is implemented partially or entirely on a semiconductor (for example, a field-programmable gate array (FPGA) semiconductor) chip. Similarly, the various modules and controllers described herein may be implemented as individual controllers, as illustrated, or as components of a single controller. In some embodiments, a combination of approaches may be used.

In some embodiments, the electronic controller 104 includes additional, fewer, or different components. For example, in some embodiments, the electronic controller 104 may include separate transmitting and receiving components (for example, a transmitter and a receiver) instead of or in addition to the transceiver 220. The electronic controller 104 may also include more than one transceiver 220. Some or all of the components of electronic controller 104 may be dispersed and/or integrated into other devices/components of the system 100 (for example, a vehicle control module or VCM, not shown, of the vehicle 102).

Figure 3:
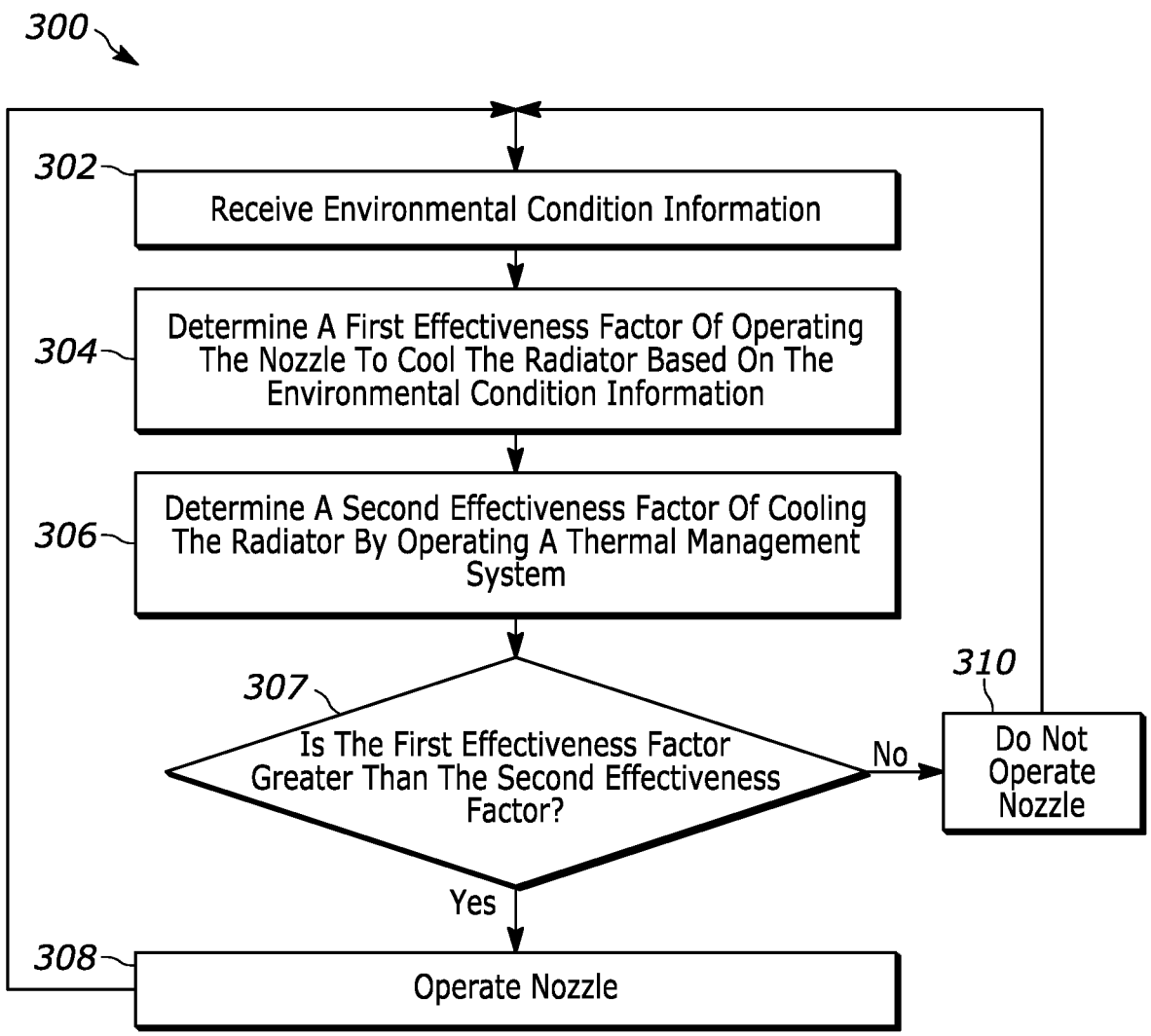
FIG. 3 is a flowchart illustrating a method of operating the evaporative cooling system of FIG. 1, according to some embodiments.

FIG. 3 illustrates an example method 300 of thermally managing the radiator 122 of the vehicle 102. As an example, the method 300 is explained in terms of the electronic controller 104, in particular the electronic processor 205. However, portions of the method 300 may be distributed among multiple devices (for example, one or more additional controllers/processors of or connected to the system 100).

At block 302, the electronic processor 205 receives environmental condition information. The environmental condition information is data regarding the environment surrounding the vehicle 102. Such information includes, for example, a weather condition, a relative humidity, a wet bulb temperature, a dry bulb temperature, and an incoming air flow speed. The environmental condition information may be received from one or more of the sensors 112 and/or via the transceiver 220. The environmental condition information may also relate to one or more characteristics within the vehicle 102 (for example, a temperature, a pressure, and/or a humidity of one or more components or the environment within the vehicle 102).

At block 304, the electronic processor 205 determines a first effectiveness factor of operating the nozzle 106 to evaporatively cool the radiator 122 based on the environmental condition information. The effectiveness factor indicates a relative efficiency of utilizing the evaporative cooling system 100 to cool the radiator 122. The first effectiveness factor is determined based on the thermal effectiveness of the cooling, the power consumption of operating the nozzle 106 versus an amount available (for example, from the battery 120 of the vehicle 102), an amount of fluid available within the fluid tank 108, and/or an evaporative cooling performance of the radiator 122.

At block 306, the electronic processor 205 determines a second effectiveness factor of cooling the radiator 122 by operating a thermal management system 113 (for example, the fan 126) of the vehicle 102. The effectiveness factor indicates a relative efficiency of utilizing the thermal management system 113 to cool the radiator 122 without utilizing the evaporative cooling system 100.

At block 307, the electronic processor 205 determines whether the first effectiveness factor exceeds the second effectiveness factor. When the first effectiveness factor exceeds the second effectiveness factor, the electronic processor 205 operates the nozzle 106 such that a fluid output is ejected at/onto the radiator 122 of the vehicle (block 308). When the second effectiveness factor exceeds the first effectiveness factor, the electronic processor 205 operates the corresponding thermal management system 113 (block 310). In some embodiments, the electronic processor 205 is further configured to affect an operation of the thermal management system 113 based on the operation of the nozzle 106 at block 312. For example, in embodiments where the thermal management system 113 is the fan 126, the electronic processor 205 may adjust the speed (i.e. RPM) of the fan 126. The adjustment may be, for example, to moderate the operational energy consumption of the thermal management system 113 and the evaporative cooling system 100.

In some embodiments, the electronic processor 205, in the determination of the first effectiveness factor at block 304, is further configured to determine an operational flow rate pattern of the fluid output of the nozzle 106. For example, a pulsed fluid spray pattern with a predetermined off period in-between may be used to allow time for the outputted fluid to develop fluid films on the surface of the radiator 122 in order to effectively utilize the evaporative cooling effect. Similarly, in embodiments where there are multiple nozzles 106, a sequential pulsed fluid spray pattern may be used, also allowing for a film of evaporative fluid to form on the radiator 122. In some embodiments, a particular operational flow rate and/or pattern is determined based on the environmental condition information. For example, in the case of a pulsed spray, the time between pulses may be greater in humid conditions than in dry conditions.

The evaporative cooling system 100 may not be effective in certain environmental conditions as compared to others. For example, in a dusty environment (for example, in a dust storm), operating the nozzle 106 may, depending on the type of dust, result in dust particulate build-up on the radiator 122. Build-up (for example, between the fins of the radiator 122) will reduce the performance of the radiator 122. As another example, in a particularly humid environment, the fluid output of the nozzle 106 will take longer to evaporate. When such environmental conditions are present, the effectiveness factor of operating the nozzle 106 is reduced.

In some embodiments, the electronic processor 205 is configured to determine an upstream pressure value and a downstream pressure value of the radiator 122. The electronic processor 205 then calculates a difference between the upstream pressure value and the downstream pressure value and compares it to a predetermined threshold. The predetermined threshold corresponds to an additional amount of pressure difference across the radiator 122 that indicates a build-up with the fins of the radiator 122 due to, for example, dust particulate. In response to the pressure difference exceeding the threshold, the electronic processor 205 halts operation of the nozzle 106.

FIG. 4 is a schematic diagram 400 illustrating the evaporative cooling system 100 according to some embodiments. In the illustrated example, the electronic controller 104 is communicatively coupled to a plurality of nozzles 402A-E (each of which being configured similar to the nozzle 106 of FIG. 1) and a pump 404. The pump 404, when operated by the electronic controller 104, provides fluid from the fluid tank 108 to each of the nozzles 402A-E via feed lines 406 (similar to the feed line 109 of FIG. 1). The electronic controller 104, as explained in more detail below, is configured to operate the nozzle 402A-E according to the method 300 of FIG. 3. Each one of the nozzles 402A-E receives fluid from the fluid tank 108. Each nozzle 402A-E is positioned proximate to the radiator 122 such the nozzle 402A-E ejects fluid at at least a portion of the radiator 122.

Figure 5:
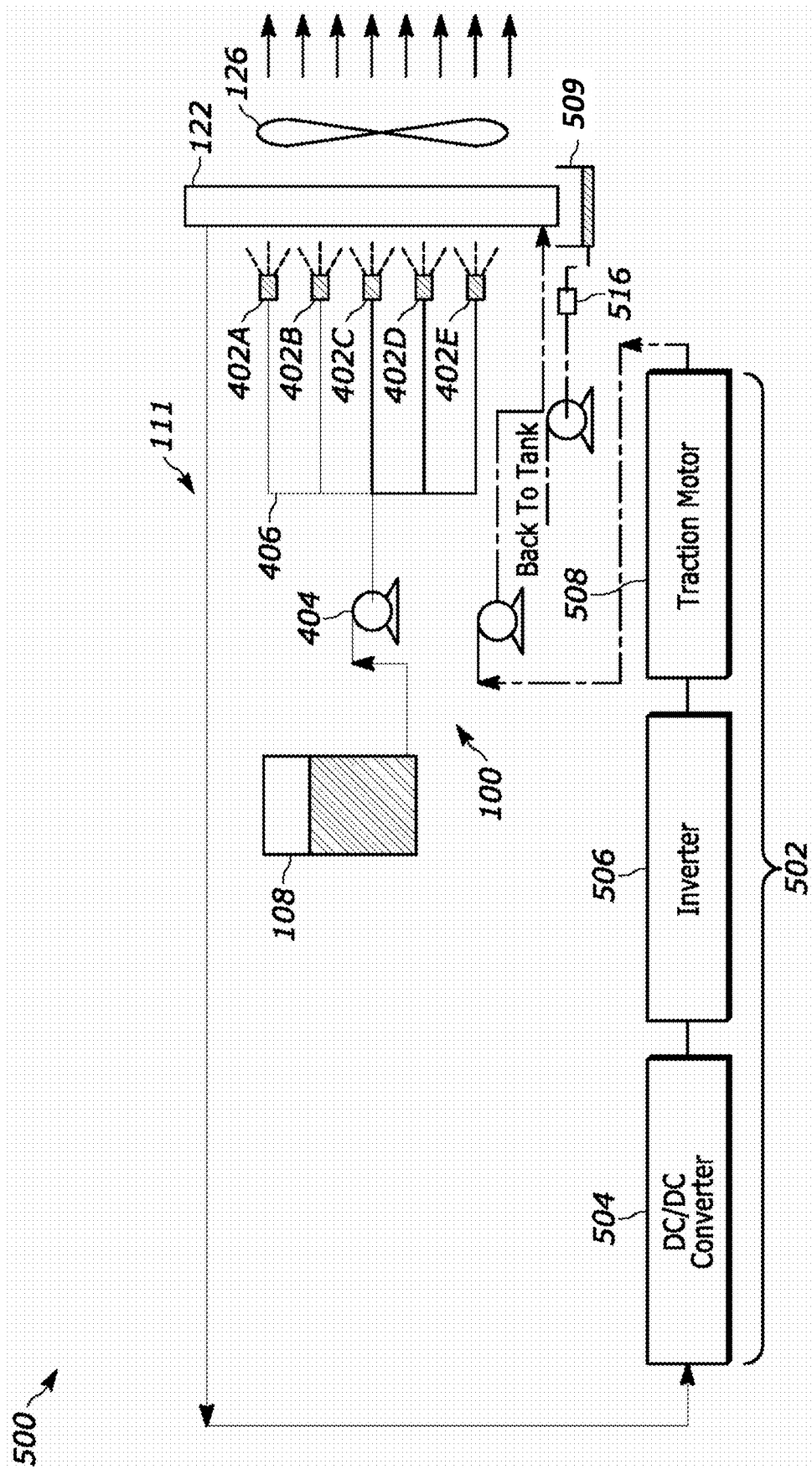
FIG. 5 is a diagram illustrating use of the evaporative cooling system of FIG. 1 within a fluid coolant circuit of the electric vehicle of FIG. 1 according to some embodiments.

FIG. 5 is a block diagram 500 illustrating use of the evaporative cooling system 100 for cooling a radiator (for example, radiator 122) within a fluid coolant circuit (for example, the circuit 111) for a plurality of power electronics 502 of the vehicle 102. In the illustrated embodiment, the power electronics 502 include a DC/DC converter 504, an inverter 506, and a traction motor 508. Hot coolant output from the power electronics 502 is fed into the radiator 122. The controller 104 of the evaporative cooling system 110 accordingly, based on the determined environmental condition information, operates one or more of the nozzles 402A-E such that fluid is sprayed at the radiator 122. Also based on the results of the method 300, the fan 126 is operated so as to provide additional cooling to the radiator 122. The cooled coolant is then output from the radiator 122 and fed back into the coolant feed lines of the circuit 501 fed through the power electronics 502.

As stated above, in the case where the vehicle 102 includes a fuel cell system, residual water/fluid output from the fuel cell stack is fed into the fluid tank 108. In embodiments where the vehicle 102 does not include a fuel cell system, the fluid stored in the unit 108 is prestored. As illustrated in FIG. 5, in some embodiments the evaporative cooling system 100 additionally includes a collecting tray 509 for collecting fluid run-off from the radiator 122. The fluid is then filtered via a filter 510 before being fed back to the fluid tank 108.

It should be understood that while the illustrated embodiment illustrates the radiator 122 as being part of a fluid coolant circuit for a plurality of power electronics 501, the radiator 122 may be part of one or more other fluid coolant circuits. For example, instead of or in addition to the power electronics 502, the radiator 122 may be part of a fluid coolant circuit for a battery pack of the vehicle 120, a fuel cell stack of the vehicle 102, and other electric powertrain components.

Figure 6:
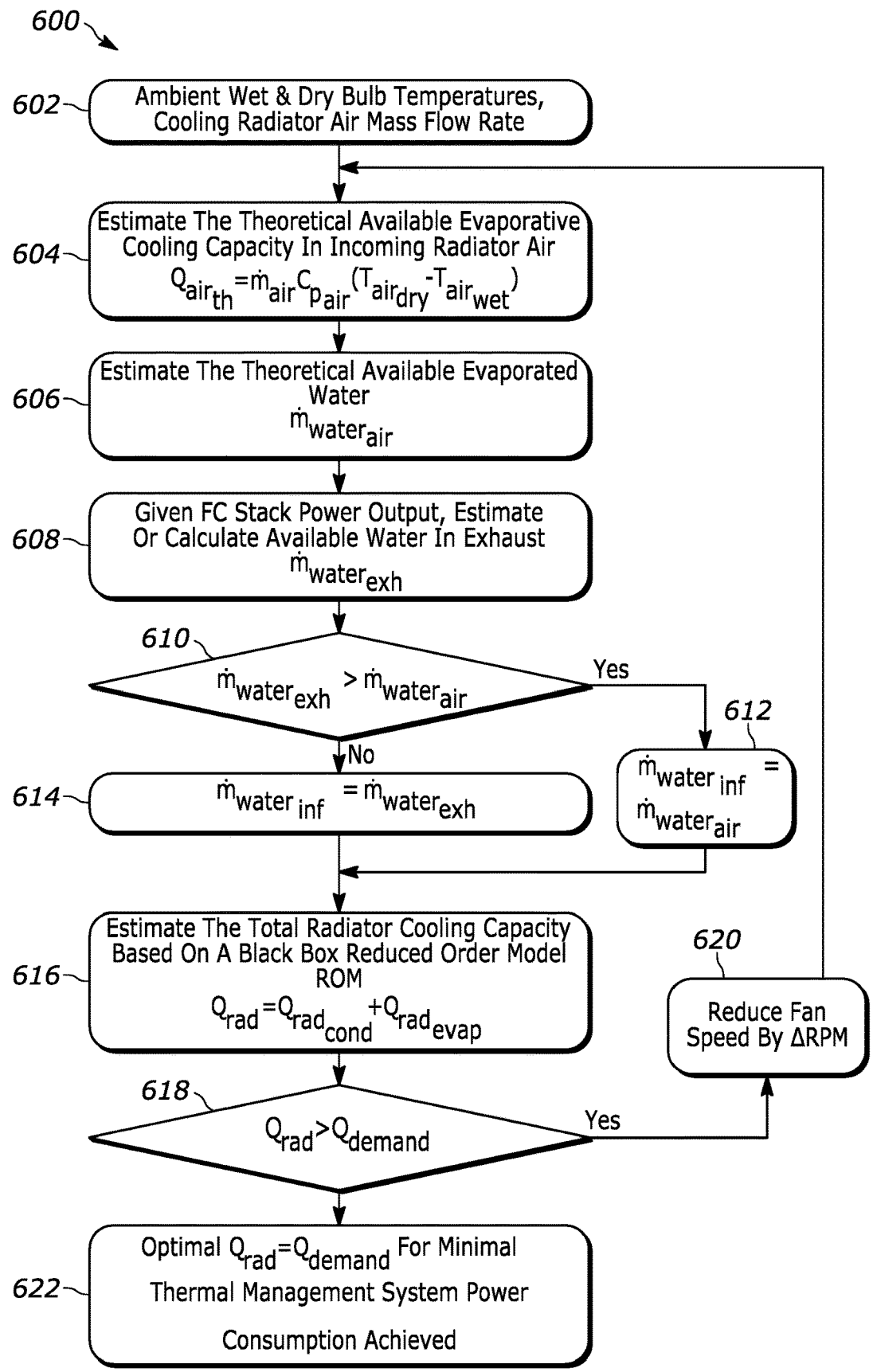
FIG. 6 is a flowchart of a control method for operating the evaporative cooling system of FIG. 1 according to some embodiments.

FIG. 6 is a flowchart illustrating an example control method 600 for operating the evaporative cooling system 100. In particular, the method 600 provides an example of determining an injection flow rate of the nozzle 106 in the case where the vehicle 102 includes a fuel cell driving system. As an example, the method 600 is explained in terms of the electronic controller 104, in particular the electronic processor 205. However, portions of the method 300 may be distributed among multiple devices (for example, one or more additional controllers/processors of or connected to the system 100).

At block 602, the electronic processor 205 receives environmental condition information including an ambient wet bulb temperature, a dry bulb temperature, and a cooling radiator air mass flow rate. Using the environmental condition information, the electronic processor 205 determines a theoretical available cooling capacity of the incoming radiator air (block 604). An example calculation for determining the theoretical available cooling capacity of the incoming radiator air is provided below:

$$Q_{air_{th}} = \dot{m}_{air} C_{P_{air}} (T_{air_{dry}} - T_{air_{wet}})$$

Where $Q_{air_{th}}$ is the theoretical cooling capacity (heat rate exchange) available in the incoming air to the radiator 122 from the fan 126, $\dot{m}_{water_{air}}$ is the incoming air mass flow rate into the radiator 122 from the fan 126, $C_{P_{air}}$ is the pressure coefficient of the incoming air to the radiator 122, and $T_{air_{dry}}$ and $T_{wet_{dry}}$ are the dry air and wet air bulb temperatures respectively.

At block 606, the electronic processor 205 estimates the theoretical available evaporated water $\dot{m}_{water_{air}}$ (the evaporated water mass flow rate that can be handled by the incoming air of the radiator 122). At block 608, determines or estimates an available water in the exhaust of the fuel cell stack $\dot{m}_{water_{exh}}$. The amount may be determined via a sensor (for example, one or more of the sensors 112) or estimated based on a power output of the fuel cell stack.

At block 610, when the water mass rate from the exhaust of the fuel cell stack $\dot{m}_{water_{exh}}$ is greater than the water mass flow rate that can be handled by the air $\dot{m}_{water_{air}}$, the injected water mass flow rate $\dot{m}_{water_{inj}}$ (i.e. the mass flow rate of the nozzle 106) is set to be the water mass flow rate that can be handled by the incoming air of the radiator 122 (block 612). Otherwise, the injected water mass flow rate $\dot{m}_{water_{inj}}$ is set to be the water mass flow rate that can be handled by the air $\dot{m}_{water_{air}}$ (block 614).

At block 616, the electronic processor 205 estimates the total radiator cooling capacity $Q_{rad}$ based on the set injected water mass flow rate $\dot{m}_{water_{inj}}$ (for example, via a simulation algorithm). The total radiator cooling capacity $Q_{rad}$ is a summation of both the convective cooling capacity $Q_{rad_{conv}}$ (i.e. from the fan 126) and the evaporative cooling capacity from the evaporative cooling system 100 $Q_{rad_{evap}}$. At block 618, the electronic processor 205 determines whether or not the total radiator cooling capacity $Q_{rad}$ is greater than an actual demanded cooling rate $Q_{demand}$ required by the fuel cell system of the vehicle 102. When the total radiator cooling capacity $Q_{rad}$ is greater than the demanded cooling rate $Q_{demand}$, the electronic processor 205 reduces the speed of the fan 126 (block 620). Otherwise, the total cooling capacity $Q_{rad}$ is maintained at approximately the demanded cooling rate $Q_{demand}$ so as to minimize power consumption (block 622).

Although described in terms of thermally managing the radiator 122, it should be understood that the systems and methods described herein may be applied to other components of the vehicle 102. For example, in some embodiments, the nozzle 106 may be configured to eject water at one or more components of a battery system (for example, within the driving system 110) of the vehicle 102 in order to thermally cool the respective component(s). The electronic processor 205 may determine the effectiveness factor of utilizing the evaporative cooling system 100 based on, for example, a rate of charging of the battery 120 of the vehicle 102.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

Thus, embodiments provide, among other things, an evaporative cooling system for an electric vehicle. Various embodiments are set forth in the following claims.

What is claimed is:

1. A radiator thermal management system for a radiator of a vehicle, the system comprising:
a fluid tank containing a fluid;
a nozzle fluidly coupled to the fluid tank; and
an electronic processor configured to:
receive environmental condition information;
determine a first effectiveness factor of operating the nozzle to cool the radiator based on the environmental condition information, wherein the first effectiveness factor indicates an efficiency of utilizing the nozzle to cool the radiator;
determine a second effectiveness factor of cooling the radiator by operating a thermal management system, wherein the second effectiveness factor indicates an efficiency of utilizing the thermal management system to cool the radiator without using the nozzle;
operate the nozzle such that a fluid output is ejected at the radiator of the vehicle when the first effectiveness factor is greater than the second effectiveness factor;
determine an upstream pressure value of the cooling radiator;
determine a downstream pressure value of the radiator;
calculate a difference between the upstream pressure value and the downstream pressure value; and
halting operation of the nozzle when the difference exceeds a threshold.

2. The system of claim 1, wherein determining the first effectiveness factor of operating the nozzle further includes determining an operational flow rate of the fluid output of the nozzle.

3. The system of claim 1, wherein the electronic processor is further configured to adjust a flow rate of the fluid output based on at least one selected from the group consisting of the environmental condition information, an amount of fluid available within the fluid tank, and an evaporative cooling performance of the radiator.

4. The system of claim 1, wherein the fluid tank is configured to receive exhaust fluid from a driving system of the vehicle.

5. The system of claim 1, wherein the environmental condition information includes at least one selected from the group consisting of a weather condition, a relative humidity, a wet bulb temperature, a dry bulb temperature, and an incoming air flow speed.

6. The system of claim 1, wherein the first effectiveness factor is determined based on an amount of fluid available within the fluid tank.

7. The system of claim 1, wherein the first effectiveness factor is reduced when the environmental condition information indicates dust particulate build-up on the radiator.

8. The system of claim 1, wherein the first effectiveness factor is reduced when the environmental condition information indicates a humid environment.

9. The system of claim 1, wherein the electronic processor is further configured to adjust an operation of the thermal management system based on an operation of the nozzle.

10. A method for thermally managing a radiator of a vehicle, the vehicle including a nozzle fluidly coupled to a fluid tank containing a fluid and configured to eject the fluid at the radiator of the vehicle, the method comprising:
receiving, at an electronic processor, environmental condition information;
determining, via the electronic processor, a first effectiveness factor of operating the nozzle based on the environmental condition information, wherein the first effectiveness factor indicates an efficiency of utilizing the nozzle to cool the radiator;
determining, via the electronic processor, a second effectiveness factor of a thermal management system for the radiator, wherein the second effectiveness factor indicate an efficiency of utilizing the thermal management system to cool the radiator without using the nozzle;
operating, via the electronic processor, the nozzle such that a fluid output is ejected at a radiator of the vehicle when the first effectiveness factor is greater than the second effectiveness factor;
determining an upstream pressure value of the radiator;
determining a downstream pressure value of the radiator;
calculating a difference between the upstream pressure value and the downstream pressure value; and
halting operation of the nozzle when the difference exceeds a threshold.

11. The method of claim 10, wherein determining the first effectiveness factor of operating the nozzle further includes determining an operational flow rate of the fluid output of the nozzle.

12. The method of claim 10, the method further comprising adjusting a flow rate of the fluid output based on at least one selected from the group consisting of the environmental condition information, an amount of fluid available within the fluid tank, and an evaporative cooling performance of the radiator.

13. The method of claim 10, wherein the fluid tank is configured to receive exhaust fluid from a driving system of the vehicle.

14. The method of claim 10, wherein the environmental condition information includes at least one selected from the group consisting of a weather condition, a relative humidity, a wet bulb temperature, a dry bulb temperature, and an incoming air flow speed.

15. The method of claim 10, wherein the first effectiveness factor is determined based on an amount of fluid available within the fluid tank.

16. The method of claim 10, wherein the first effectiveness factor is reduced when the environmental condition information indicates dust particulate build-up on the radiator.

17. The method of claim 10, wherein the first effectiveness factor is reduced when the environmental condition information indicates a humid environment.

18. The method of claim 10, the method further comprising adjusting an operation of the thermal management system based on an operation of the nozzle.

19. A radiator thermal management system for a radiator of a vehicle, the system comprising:
a fluid tank containing a fluid;
a nozzle fluidly coupled to the fluid tank; and
an electronic processor configured to:
receive environmental condition information;
determine a first effectiveness factor of operating the nozzle to cool the radiator based on the environmental condition information;
determine a second effectiveness factor of cooling the radiator by operating a thermal management system;
operate the nozzle such that a fluid output is ejected at the radiator of the vehicle when the first effectiveness factor is greater than the second effectiveness factor;
determine an upstream pressure value of the cooling radiator;
determine a downstream pressure value of the radiator;
calculate a difference between the upstream pressure value and the downstream pressure value; and halting operation of the nozzle when the difference exceeds a threshold.

* * * * *